United States Patent
Rexilius

(10) Patent No.: US 8,427,846 B2
(45) Date of Patent: Apr. 23, 2013

(54) INVERTER CIRCUIT HAVING A CONTROLLER TO SUPPLY A REACTIVE CURRENT ON A PHASE WITH A VOLTAGE DROP

(75) Inventor: Stephan Rexilius, Flensburg (DE)

(73) Assignee: FeCon GmbH, Flensburg (DE)

( * ) Notice: Subject to any disclaimer, the term of this patent is extended or adjusted under 35 U.S.C. 154(b) by 306 days.

(21) Appl. No.: 12/871,117

(22) Filed: Aug. 30, 2010

(65) Prior Publication Data

US 2011/0286253 A1  Nov. 24, 2011

(30) Foreign Application Priority Data

May 20, 2010 (EP) .................................... 10005279

(51) Int. Cl.
*H02M 3/335* (2006.01)
*H02M 7/537* (2006.01)
*H02H 7/122* (2006.01)

(52) U.S. Cl.
USPC .... 363/17; 363/56.01; 363/56.02; 363/56.03; 363/56.05; 363/131; 363/132

(58) Field of Classification Search .............. 363/17, 363/56.01, 56.02, 56.03, 56.05, 131, 132
See application file for complete search history.

(56) References Cited

U.S. PATENT DOCUMENTS

| 4,400,659 | A | * | 8/1983 | Barron et al. | 322/32 |
| 5,652,485 | A | * | 7/1997 | Spiegel et al. | 318/147 |
| 7,605,487 | B2 | * | 10/2009 | Barton et al. | 290/44 |
| 7,741,728 | B2 | * | 6/2010 | Fortmann et al. | 290/44 |
| 2005/0062290 | A1 | | 3/2005 | Stahlkopf | |
| 2007/0273155 | A1 | * | 11/2007 | Barton et al. | 290/44 |
| 2008/0252076 | A1 | * | 10/2008 | Fortmann et al. | 290/44 |
| 2010/0002475 | A1 | | 1/2010 | Folts et al. | |
| 2010/0176770 | A1 | | 7/2010 | Fortmann | |

FOREIGN PATENT DOCUMENTS

| DE | 19638880 C1 | 5/1998 |
| EP | 2202862 A1 | 6/2010 |
| WO | 2005/031160 A2 | 4/2005 |
| WO | 03 065567 A1 | 3/2010 |

* cited by examiner

*Primary Examiner* — Bao Q Vu
(74) *Attorney, Agent, or Firm* — Saliwanchik, Lloyd & Eisenschenk

(57) ABSTRACT

A three-phase inverter circuit includes an inverter incorporating a plurality of controllable power switches, and an electronic control device adapted to control the power switches. The control device in the event of a measured voltage drop on one phase is adapted to supply a reactive current on the phase with voltage drop and to supply and/or draw an active current on at least one phase without voltage drop.

22 Claims, 3 Drawing Sheets

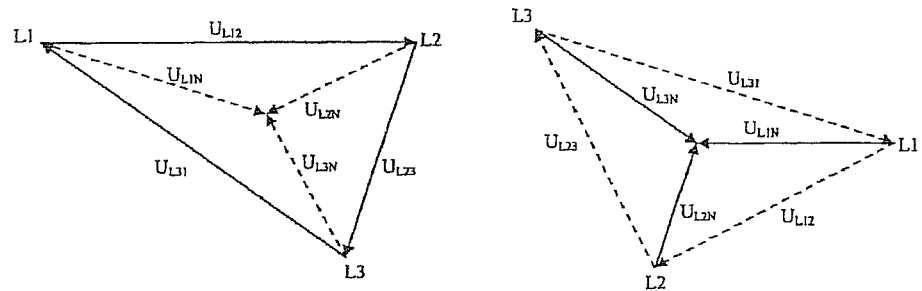
Fig. 2a                                Fig. 2b
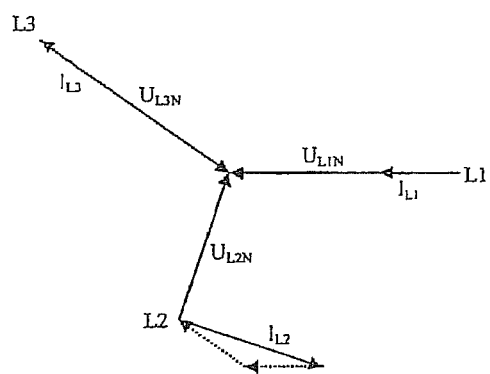
Fig. 3

INVERTER CIRCUIT HAVING A CONTROLLER TO SUPPLY A REACTIVE CURRENT ON A PHASE WITH A VOLTAGE DROP

The invention relates to a three-phase inverter circuit including an inverter comprising a plurality of controllable power switches, and an electronic control device adapted to control the power switches. The invention further relates to a method for operating a three-phase inverter circuit.

Such an inverter circuit is known for example from document WO 03 065567 A1. Three-phase inverter circuits are used for example in circuit arrangements for supplying current from renewable energy plants, in particular wind power plants, photovoltaic plants and fuel cells, to a three-phase network. Supplying reactive current on one phase as a result of an unbalanced voltage drop may lead to an undesired voltage increase up to over 110% of the standard voltage on the phases without voltage drop.

It is the object of the invention to provide a three-phase inverter circuit and a method, in which a voltage increase up to over 110% of the standard voltage on the phases without voltage drop can be prevented with simple means.

The invention solves this object with the features of the independent claims. Suitably supplying and/or drawing an active current on at least one phase without voltage drop can counteract a voltage increase on the phases without voltage drop and, in particular, can prevent its increase up to over 110%.

Preferably, an active current is supplied on one phase without voltage drop, whereas on the other phase without voltage drop an active current is drawn, in order to counteract the generation of additional active power. Ideally, the amounts of the active currents supplied and drawn on the phases without voltage drop are essentially equal so that the system shows an overall neutral behaviour with respect to active power.

In a particularly preferred embodiment of the invention, the set active currents on the phases without voltage drop are calculated in such a way that the sum of the currents on all phases totally amounts to zero. It is thus possible to comply with the requirements with respect to the maximum voltage increase on the intact phases without additional measures like for example a current compensation line between the DC voltage side and the AC voltage side. In this respect, the invention has realized that no individual control of the individual phases is required in order to comply with all aforementioned requirements.

As the voltage of the phase affected by a short circuit may drop to such a great extent that the position of the corresponding voltage vector can no longer be determined with sufficient precision, at least under such circumstances the voltage vector of the phase with voltage drop preferably is calculated with essentially higher precision from the measured voltage vectors of the remaining phases.

In the following, the invention is described in more detail on the basis of preferred embodiments referring to the attached figures, wherein:

FIG. 2a, 2b show phasor diagrams for the D-side or the Y-side of the DY transformer from FIG. 1 in the event of a voltage drop on one phase;

FIG. 3 shows a phasor diagram illustrating the current control according to the invention.

Figure 1:
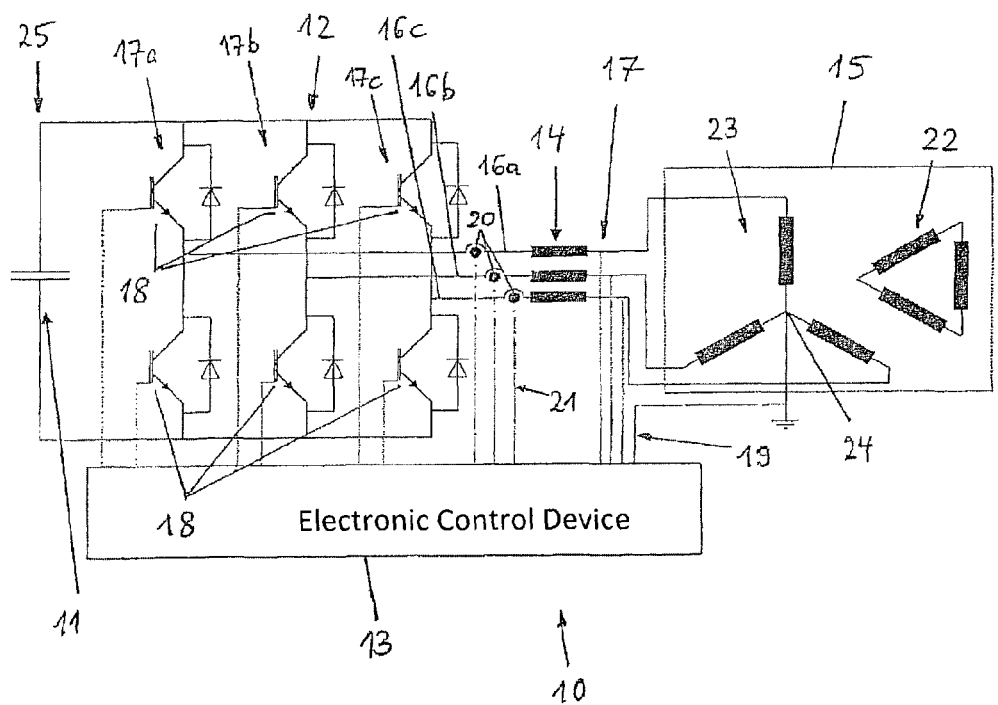
FIG. 1 shows an inverter circuit according to the invention.

The inverter circuit 10 includes an intermediate dc circuit 11, an inverter 12, a filter 14, a medium-voltage transformer 15 and an electronic control device 13, for example a digital signal processor DSP. In a per se known manner, the inverter 12 for each phase 16a, 16b, 16c of the AC voltage side 17 includes a respective cascade 17a, 17b, 17c each of which comprises two power switches 18, in particular power transistors, for example IGBTs.

The three-phase current is smoothed on the AC voltage side 17 using the filter 14 and may then be transformed to a desired voltage using the medium-voltage transformer 15. The filter 14 can be designed as an inductor or as a transformer. The medium-voltage transformer 15 may be suitably chosen depending on the application. For supplying current to a medium-voltage network, the transformer 15 may be designed for example as a DY medium-voltage transformer.

The power switches 18 are controlled using the electronic control device 13 in particular by means of pulse-width modulation control. The supply voltages are measured on the AC voltage side 17 of the inverter 12, preferably between the filter 14 and the medium-voltage transformer 15, and are supplied together with the ground potential via corresponding lines 19 to the control device 13 as measured voltage signals. The currents on the individual phases are measured on the AC voltage side 17, preferably between the inverter 12 and the filter 14, using corresponding current measuring devices 20 and are supplied via corresponding lines 21 to the control device 13 as measured current signals. The control device 13 calculates the set currents from the measured voltages and currents. On the basis of the set currents and the measured currents the control device 13 determines the control signals for the power switches 18 and controls them correspondingly.

FIG. 2a shows a phasor diagram for the D-side 22 of the transformer 15 from FIG. 1 in the event of a voltage drop, here for example of the voltage $U_{L23}$, for example by 40%. FIG. 2b shows a corresponding phasor diagram for the Y-side 23 of the transformer 15. In the present example the voltage $U_{L2N}$ drops extremely, namely by 50%, whereas each of the voltages $U_{L1N}$ and $U_{L3N}$ reduces only a little bit by approximately 9%.

In order to counteract the voltage drop shown in the FIGS. 2a, 2b, a current control, which in the following will be explained in detail based on FIG. 3, is performed by the control device 13. First, the dropped voltage vector $U_{L2N}$ is calculated from the measured intact voltage vectors $U_{L1N}$ and $U_{L3N}$. This allows a significantly exacter determination of the dropped voltage vector $U_{L2N}$ compared to a direct measurement of $U_{L2N}$, in particular in the event of a complete or essentially complete voltage drop.

The current control provides for a reactive current $I_{L2}$ to be supplied on the affected phase $U_{L2N}$ only. For this purpose, the control device 13 calculates a set reactive current $I_{L2}$ preferably amounting to at least 40% of the nominal current, which is to be supplied on the affected phase $U_{L2N}$ only. However, on the phases $U_{L1N}$ and $U_{L3N}$, which are not affected, active current is drawn and supplied, respectively. More precisely, on one of the intact phases, here on the phase $U_{L1N}$, an active current $I_{L1}$ is supplied, and on the other intact phase, here on the phase $U_{L3N}$, an active current $I_{L3}$ is drawn with the amounts of the active currents $I_{L1}$ and $I_{L3}$ preferably being equal so that the total active power balance is zero. The amount of the supplied and drawn active current $I_{L1}$, $I_{L3}$ depends on the depth of the voltage drop on the affected phase $U_{L2N}$, however, in any case, is less than the nominal active current.

When practically applying the above method, at first one of the set active currents $I_{L1}$ ($I_{L3}$) is calculated in the control device 13 in such a way that the voltage on the corresponding phase $U_{L1N}$ ($U_{L3N}$) does not increase up to more than 110% relative to normal conditions. The other set active current $I_{L3}$ ($I_{L1}$) is then calculated using Kirchhoff's current rule leading to an active current having the same amount, so that also on the other intact phase $U_{L3N}$ ($U_{L1N}$) the voltage does not increase up to more than 110% relative to normal conditions. The determined set active currents $I_{L1}$, $I_{L2}$, $I_{L3}$ are then supplied to the AC voltage network by controlling the power switches 18 correspondingly.

It is only possible to apply Kirchhoff's current rule in the described manner because the neutral point 24 of the transformer 15 is not connected to the intermediate circuit 11, as needed for an individual phase current control in order to enable a current compensation between the DC voltage side 25 and the AC voltage side 17 of the inverter 12. Compared to an individual phase current control the inverter circuit 10 thus is characterized by the neutral point 24 of the transformer 15 being held at a fixed potential, in particular ground potential; and the intermediate dc circuit 11 has no additional connection to the AC voltage side 17 of the inverter 12 so that a corresponding current compensation line can be disposed with.

Figure 4:
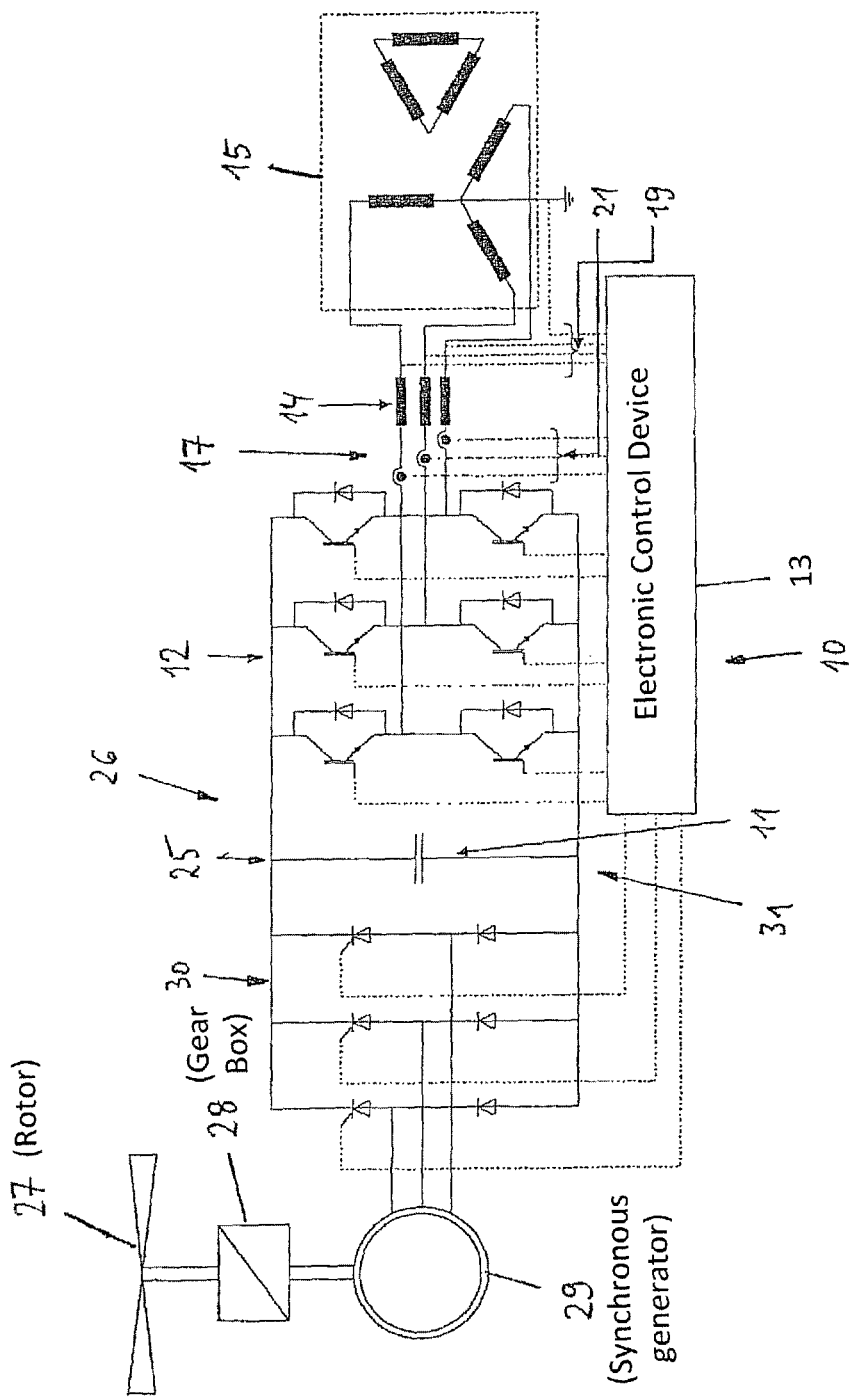
FIG. 4 shows an application of the inverter circuit according to the invention in a circuit arrangement for supplying current from a wind power plant to a three-phase network.

The intermediate dc circuit 11 may be connected to a DC power source, for example a plant for generating renewable energy. Such an application is shown for example in FIG. 4 in the form of a wind power plant 26 with variable speed, including a rotor 27, a gearbox 28, a synchronous generator 29, a controlled rectifier 30 which is connected to the inverter circuit 10 according to FIG. 1 so that the rectifier 30 and the inverter 12 form a frequency converter 31. However, the invention is not limited to this application. Further preferred embodiments are photovoltaic plants, fuel cells or other DC power sources.

Furthermore, the inverter circuit 10 may also be operated in reverse, if, instead of a DC power source 27-30, a DC power consumer is connected on the DC voltage side 25 of the inverter 12. Finally, the inverter 12 according to FIG. 1 may as well work at the intermediate circuit 11 without the connection of a DC power source or a DC power sink on the DC voltage side 25, and thus may be connected to a three-phase network via the transformer 15 in an autarkic manner.

The current control of the inverter circuit 10 was described above for the case that the voltage drops significantly on one phase only. This description may be transferred accordingly to a current control of the inverter circuit 10 according to the invention for the case of a voltage drop on a plurality of phases.

I claim:

1. A three-phase inverter circuit, including an inverter comprising a plurality of controllable power switches, and an electronic control device adapted to control the plurality of controllable power switches, wherein the electronic control device in the event of a measured voltage drop on one phase is adapted to supply a reactive current on the phase with the measured voltage drop, only, and to supply and/or draw an active current on at least one phase without the measured voltage drop.

2. The inverter circuit according to claim 1, wherein on one of the phases without the measured voltage drop a first active current is supplied, and on another one of the phases without the measured voltage drop a second active current is drawn.

3. The inverter circuit according to claim 2, wherein an amount of the first active current and an amount of the second active current are essentially equal.

4. The inverter circuit according to claim 1, wherein the first active current and the second active current are calculated in such a way that a sum of currents on all phases is zero.

5. The inverter circuit according to claim 1, wherein a voltage vector of the phase with the measured voltage drop is calculated from measured voltage vectors of the remaining phases.

6. The inverter circuit according to claim 1, wherein no separate current compensation between a DC voltage side of the inverter and an AC voltage side of the inverter is provided.

7. The inverter circuit according to claim 1, including at least one medium-voltage transformer on an AC voltage side of the inverter.

8. The inverter circuit according to claim 7, wherein a neutral point of the at least one medium-voltage transformer designed as DY transformer is set to a fixed potential.

9. The inverter circuit according to claim 1, including at least one intermediate dc circuit on a DC voltage side of the inverter.

10. The inverter circuit according to claim 9, wherein apart from the inverter and, where applicable, a rectifier, no further current source or current sink is connected to the at least one intermediate dc circuit.

11. The inverter circuit according to claim 1, wherein a current measuring device is provided between the inverter and a filter for smoothening a current on the AC voltage side of the inverter.

12. A frequency converter, comprising:
 a rectifier circuit; and
 a three-phase inverter circuit, wherein the three-phase inverter circuit comprises an inverter with a plurality of controllable power switches and an electronic control device adapted to control the plurality of controllable power switches, wherein the electronic control device in the event of a measured voltage drop on one phase is adapted to supply a reactive current on the phase with the measured voltage drop, only, and to supply and/or draw an active current on at least one phase without the measured voltage drop.

13. The frequency converter according to claim 12, wherein on one of the phases without the measured voltage drop a first active current is supplied, and on another one of the phases without the measured voltage drop a second active current is drawn.

14. The frequency converter according to claim 13, wherein an amount of the first active current and an amount of the second active current are essentially equal.

15. The frequency converter according to claim 12, wherein the first active current and the second active current are calculated in such a way that a sum of currents on all phases is zero.

16. The frequency converter according to claim 12, wherein a voltage vector of the phase with the measured voltage drop is calculated from measured voltage vectors of the remaining phases.

17. The frequency converter according to claim 12, wherein no separate current compensation between a DC voltage side of the inverter and an AC voltage side of the inverter is provided.

18. The frequency converter according to claim 12, including at least one medium-voltage transformer on an AC voltage side of the inverter, wherein a neutral point of the at least one medium-voltage transformer designed as DY transformer is set to a fixed potential.

19. The frequency converter according to claim 12, including at least one intermediate dc circuit on a DC voltage side of the inverter, wherein apart from the inverter and, where applicable, a rectifier, no further current source or current sink is connected to the at least one intermediate dc circuit.

20. A method for operating a three-phase inverter circuit, including pulse-width modulation control of a plurality of controllable power switches, wherein in the event of a measured voltage drop on one phase a reactive current is supplied on the phase with the measured voltage drop and an active current is supplied and/or drawn on at least one phase without the measured voltage drop.

21. The inverter circuit according to claim 8, wherein the fixed potential is a ground potential.

22. The frequency converter according to claim 18, wherein the fixed potential is a ground potential.

* * * * *